T. STEBBINS.
COUPLING FOR WELL PUMP RODS.
APPLICATION FILED FEB. 12, 1913.
1,097,995.
Patented May 26, 1914.
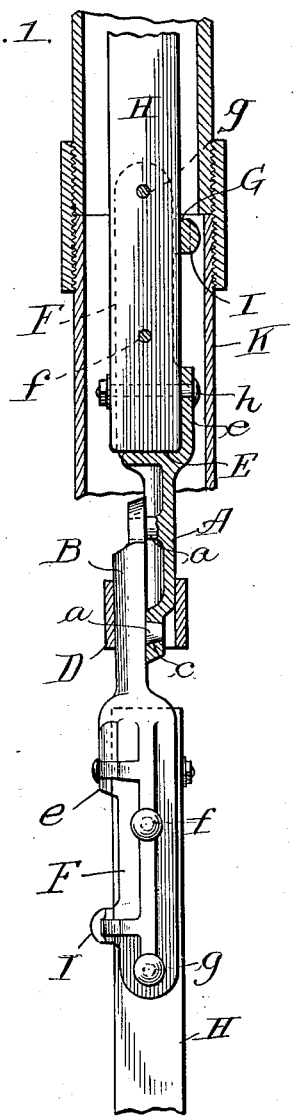
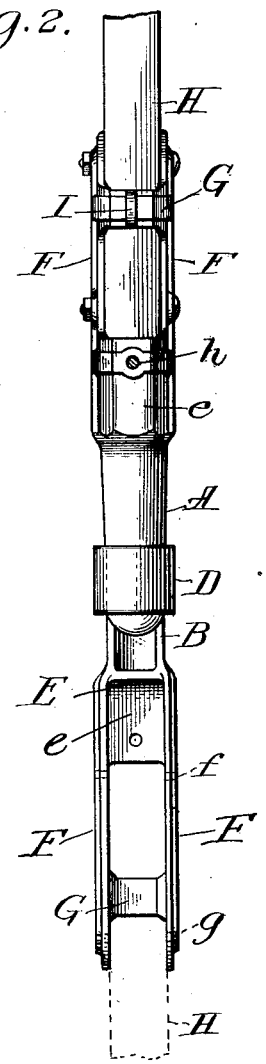
Witnesses
Inventor
Timothy Stebbins
by Frank D. Thomason.
Atty.

UNITED STATES PATENT OFFICE.

TIMOTHY STEBBINS, OF DAVENPORT, IOWA, ASSIGNOR TO RED JACKET MANUFACTURING COMPANY, OF DAVENPORT, IOWA, A CORPORATION OF IOWA.

COUPLING FOR WELL-PUMP RODS.

1,097,995.            Specification of Letters Patent.        Patented May 26, 1914.

Application filed February 12, 1913. Serial No. 747,900.

*To all whom it may concern:*

Be it known that I, TIMOTHY STEBBINS, a citizen of the United States, residing at Davenport, in the county of Scott and State of Iowa, have invented new and useful Improvements in Couplings for Well-Pump Rods, of which the following is a full, clear, and exact description.

My invention relates to couplings for pump rods, and more particularly to the part or shank of the members thereof to which the ends of the rod are secured. Heretofore considerable difficulty has been experienced in attaching the ends of the rods to the shanks of the coupling-members to get the rods in perfect alinement with the said member and with each other, so as to make all parts of the pump rod aline from end to end, and prevent the loosening of the ends of the rod sections in the shanks of the couplings by reason of the enlargement of the screw holes or the splitting of the ends thereof. I avoid these objections by providing the coupling members with a shank, which, when the ends of the rod are fitted therein, will always aline with the axis of the coupling-members and will be prevented from having a lateral or independent movement by cross-bars and rivets. The construction of my improved coupling shanks permit these results to be accomplished quickly and easily, by the means hereinafter fully described, and as particularly pointed out in the claims.

In the drawings: Figure 1 is a side elevation of my improved rod coupling placed within a suitable length of pipe, which latter is shown in section, showing the shank of one of the couplings in longitudinal section. Fig. 2 is an elevation thereof looking at the same in a direction at right angles to the view point of Fig. 1.

Referring to the drawings, A and B represent the engaging ends of the two members of the coupling to which I prefer to attach my improved shank. These ends are made semi-circular in cross-section and they lap against each other, preferably, their entire length by bringing the flat sides thereof together so that the pin *a* of one member projecting from its flat side near the end thereof adjacent its shank, will project into the opening *c* of the other member near the unattached end of the latter, and vice versa. The interlocking of the pin of each member with the opening in the other member prevents longitudinal movement, and the lateral movement or separation of said members when thus interlocked is prevented by means of a sleeve D, which is slipped down over the lapped portions of said members, substantially as shown. In order to prevent the sleeve D from becoming lost, I prefer to make one or both of said members slightly tapered, the one, upon which the sleeve is permanently mounted, being greatest in diameter at its free end and tapering to a less diameter at its opposite end, and the other, tapering from its free extremity to a greater diameter at its shank end.

While I prefer to use the type of coupling thus briefly described, it will, from the following description, be apparent that my improved shank can be used in conjunction with any other form of coupling.

My improved shank comprises an integral extension of the lapping end portion of each coupling member. The longitudinal disposition of the shank to the lapping end of its member is such that the axis of the shank will aline with the plane of the flat engaging surface of its lapping end. These shanks are made by gradually and symmetrically increasing the root of its lapping end transversely in thickness to form a bolster E which is, preferably, substantially square or rectangular in cross-section, and then providing the opposite sides of this bolster with longitudinally extending parallel corresponding leaves or bifurcations F, F. These leaves extend longitudinally a suitable distance, substantially as shown, and their inner surfaces are made flat and parallel to each other, and the corresponding edges on one side thereof are connected, for a distance of about one inch or one inch and a half next said bolster by a cross web *e*, the inner flat surface of which is disposed at right angles to the inner flat surfaces of said leaves. At a point near the ends thereof opposite said bolster, the edges of the leaves on the same side as said web, are connected by a cross-bar G, and the inner straight surface of this bar is disposed in the same longitudinal plane as the inner flat surface of said web. The distance between the two leaves F, F, corresponds in thickness to that of the ends of the straight wooden rod-sections H, H, which are to be inserted in the socket formed by said bolster, plates and web, and when the end of such a rod is thus inserted between said leaves, with its extremity bearing against the bolster, and one of its sides bearing against both the inner surface of the web and the inner surface of the crossbar, said rod will be in perfect alinement with the axis of the lapping end of its coupling member. In this position it can be readily secured in said socket by inserting an auger in one of the holes $f$ in one side of said leaves near the bolster and boring through it and out of the hole in the opposite leaf in transverse alinement therewith, and then inserting said auger through one of the holes $g$ near the end of one of the leaves and out of the hole $g$ in the opposite leaf in transverse alinement therewith. Rivets or bolts are inserted through these transverse openings in the leaves and rod and are secured therein in the usual manner to permanently attach the end of the pump rod in the shank.

At a suitable point, preferably, midway the leaves F, F, web $e$ is provided with a screw or bolt hole, and in order to prevent the rod from splitting, a bolt or rivet $h$ is inserted therethrough, and through a suitable transverse hole in the rod. I prefer to employ but one transverse bolt $h$, and to provide on the outside of the cross-bar G, preferably, about midway between leaves F, F, a protuberance or boss, I, whose outer convexed edge is in the direction of the length of the rod. The projection of this boss I is such that, if the coupling is located near the joint of the the well-pipe K, said boss will, during the reciprocation of the pump rod, prevent any rivet or nut or other projecting part of the couplings or shanks thereof from catching on or striking against any shoulder that may result from any differences in the bores, or any defect in the opposing ends of the pipe sections forming said joint, or from the failure to bring the ends of the sections together, and breaking or injuring the coupling, or throwing the sections of the pump-rod out of alinement. Attention is called to the fact that where there is a separation between the ends of the pipe sections, it would never be greater than the distance between rivet $h$ and boss I, and that, consequently, one or the other would always be in contact with the inner wall of the pipe, and thus prevent either of them entering the annular space between the pipes. In order to insure the smooth running of the coupling in the bore of the pipe past any such defective or imperfect joint, I prefer to make the rectangular transverse dimensions of bolster E such that the leaves F, F, will not come in contact with the bore of the well-pipe, and I prefer also to truncate or bevel the corners and edges of said bolster, substantially as shown.

When constructed in the foregoing manner, my improved coupling can be applied to the end of a pump rod section by unskilled workmen, easily and quickly, so that the rod and coupling will be in perfect axial alinement; the possibility of the pump rods being oblique to the axis of the bore of the well-pipe will be avoided, and the strain on the pump rod sections, their ends and the coupling-members attached thereto, will be in axial alinement from the superstructure of the pump to the foot valve, and, for this reason, no transverse strain will be exerted upon any of the bolts or rivets connecting the ends of the rods to the shanks of the coupling members, and there will be no lateral wear on the bolt holes in the rod, and no independent lateral movement of the latter to permit of their ever becoming oblique to the axis of the bore of the well-pipe or out of axial alinement with each other.

What I claim as new is:

1. A coupling for pump-rods consisting of a pair of suitably shaped interlocking members the shank of each of which comprises a bolster having oppositely disposed parallel bifurcations extending therefrom that have transverse alining bolt openings therein, a web connecting one side of the corresponding edges of said bifurcations adjoining said bolster whose inner surface is at right angles to that of said bifurcations and which is provided with a bolt opening, the opposite edges of said bifurcations being open and unobstructed, and a ring engaging said bolsters and clamping the same together.

2. A coupling for pump-rods consisting of a pair of suitably shaped interlocking members the shank of each of which comprises a bolster having oppositely disposed parallel bifurcations extending therefrom, a web connecting one side of the corresponding edges thereof adjacent said bolster, the opposite edges of said bifurcations being open and unobstructed, a cross-bar connecting the said edges at a point nearer the ends of said bifurcations opposite said bolsters the inner surface of which is in the same longitudinal plane as that of the web and together therewith are at right angles to the inner surface of the bifurcations, and a ring engaging said bolsters and clamping the same together.

3. A coupling for pump-rods consisting of a pair of suitably shaped interlocking members the shank of each of which comprises a bolster having oppositely disposed parallel bifurcations extending therefrom that have transversely alining bolt openings therein, a web connecting one side of the corresponding edges thereof adjacent said bolster whose inner surface is at right angles to that of said bifurcations and has a bolt opening therein, the opposite edges of said bifurcations being open and unobstructed, a cross-bar connecting the aforesaid edges at a point between said web at the ends of the same opposite said bolster, which cross-bar has a boss projecting outwardly therefrom, and a ring engaging said bolsters and clamping the same together.

In witness whereof I have hereunto set my hand this 5 day of Feby. 1913.

TIMOTHY STEBBINS.

Witnesses:
WALTER M. BALLUFF,
EDNA TAYLOR.